United States Patent

Tsai

[11] Patent Number: 5,517,735
[45] Date of Patent: May 21, 1996

[54] SAFETY ROPE HOOK

[76] Inventor: James Tsai, 103, Ta Ming 1 Road, Tung Pao Tsun, Tan Tzu Hsiang, Taichung Hsien, Taiwan

[21] Appl. No.: 305,955
[22] Filed: Sep. 16, 1994
[51] Int. Cl.⁶ .............................. A44B 13/00; F16B 45/00
[52] U.S. Cl. .................... 24/599.9; 24/600.3; 24/601.1
[58] Field of Search ................. 24/599.9, 600.9, 24/601.1, 599.2, 599.3, 599.4, 599.5, 600.3, 600.4, 265 H

[56] References Cited

U.S. PATENT DOCUMENTS

| | | | |
|---|---|---|---|
| 1,430,824 | 10/1922 | Martin | 24/599.9 |
| 2,418,111 | 4/1947 | Dahlander | 24/599.3 |
| 2,462,965 | 3/1949 | Henderson | 24/599.3 |
| 2,561,017 | 7/1951 | Garrison | 24/599.3 |
| 4,380,101 | 4/1983 | Joubert et al. | 24/601.1 |
| 5,210,914 | 5/1993 | Katsma | 24/600.3 |
| 5,253,396 | 10/1993 | Rekuc et al. | |
| 5,274,887 | 1/1994 | Fudaki | |
| 5,317,788 | 6/1994 | Esposito et al. | |

Primary Examiner—Victor N. Sakran
Attorney, Agent, or Firm—Bacon & Thomas

[57] ABSTRACT

A safety rope hook including a hook body and a latch pivotably connected to the hook body and releasably connected to a hooked end of the hook body to close an opening defined within the hook body, wherein the hooked end terminates in a rounded tip and the latch has a raised potion inside a notched coupling portion, which passes over the rounded tip and engages with it to hold the notched coupling portion and the hooked end firmly connected together when the notched coupling portion of the latch is forced toward the hooked end of the hook body.

4 Claims, 3 Drawing Sheets

SAFETY ROPE HOOK

BACKGROUND OF THE INVENTION

The present invention relates to a safety rope hook for fastening a rope or the like which comprises a hook body and a latch pivotably connected to the hook body, wherein the opening of the hook body is closed when the latch is turned inwards with its raised portion engaged with the rounded tip of the hook body, and the opening of the hook body is opened when the latch is turned outwards from the rounded tip of the hook body.

When fastening a load on a luggage carrier or the like, a binding rope may be used. A binding rope for this purpose commonly has both ends respectively mounted with a respective rope hook, as shown in FIG. 6, so that the both ends of the binding rope can be hung on the frame bars of the luggage carrier or the like when the binding rope is wound around the load. This structure of rope hook is not safe in use because it may easily detach from it's hooked position. There is known a rope hook with a safety latch designed to eliminate the latter problem. However, this structure of rope hook is still not satisfactory in function. Because the safety latch must be turned inwards to open the rope hook or outwards when to close the rope hook, it is not easy to hook the rope hook on an object. Furthermore, when the hook is stretched to deform, a gap may occur between the hooked end of the hook and the free end of the latch, causing the rope hook to detach from the hooked position.

SUMMARY OF THE INVENTION

The present invention has been accomplished to provide a safety rope hook which eliminates the aforesaid drawbacks. It is one object of the present invention to provide a safety rope hook which is safe in use. It is another object of the present invention to provide a safety rope hook which is easy to operate. It is still another object of the present invention to provide a safety rope hook which is inexpensive to manufacture.

According to one aspect of the present invention, the safety rope hook comprises a hook body and a latch pivotably connected to the hook body and releasably connected to the hooked end of the hook body to close the opening defined within the hook body, wherein the hooked end of the hook body terminates in a rounded tip. The latch has a raised potion inside a notched coupling portion thereof, which raised portion passes over the rounded tip and engages with it to hold the notched coupling portion and the hooked end firmly connected together when the notched coupling portion of the latch is forced toward the hooked end of the hook body.

According to another aspect of the present invention, the latch is closed when turned inwards toward the hooked end of the hook body, or opened when turned outwards from the hooked end of the hook body, and therefore the latch does not hinder the hooking operation of the hook body when opened.

According to still another aspect of the present invention, the latch and the hook body are respectively molded from resilient plastics, and therefore the manufacturing cost of the safety rope hook is cheap.

DETAILED DESCRIPTION OF THE PREFERRED EMBODIMENT

Figure 2:
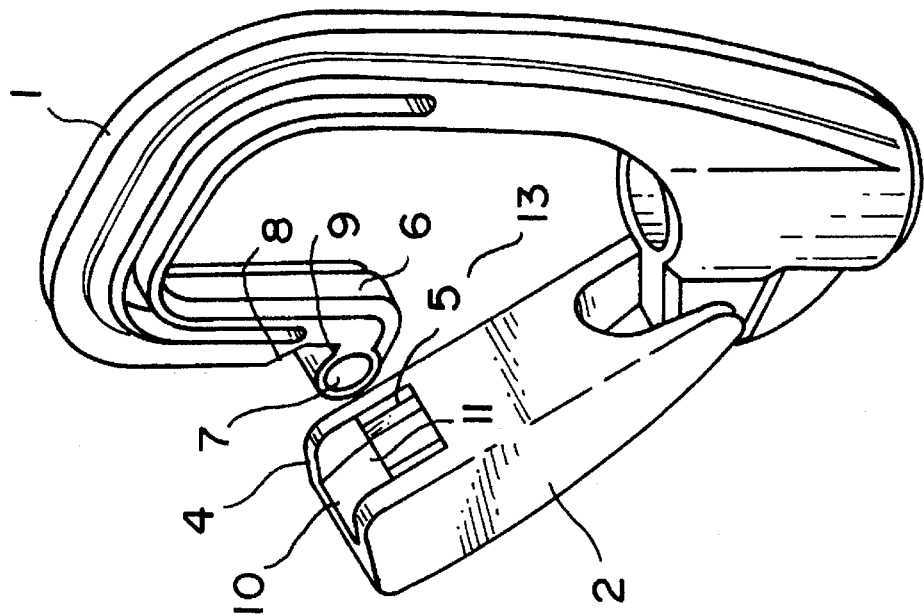
FIG. 2 is similar to FIG. 1 but showing the latch opened.
Figure 1:
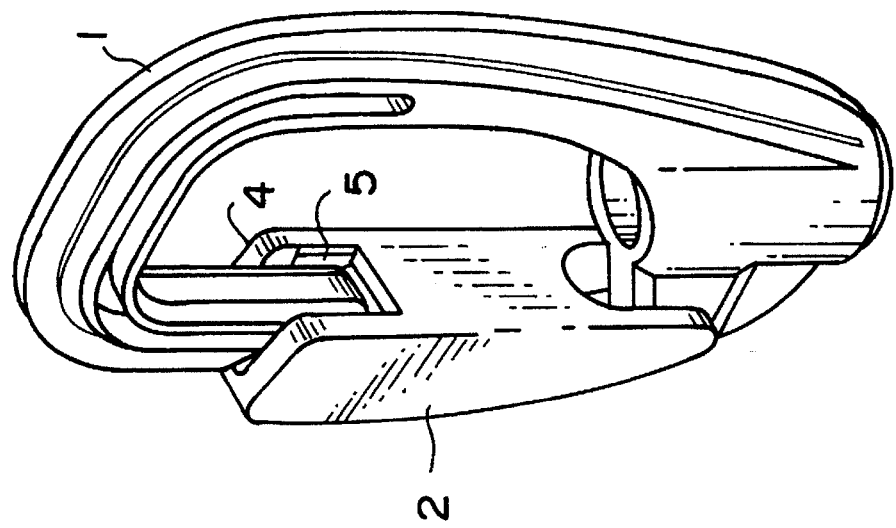
FIG. 1 is an elevational view of a safety rope hook according to the present invention.
Figures 3, 4:
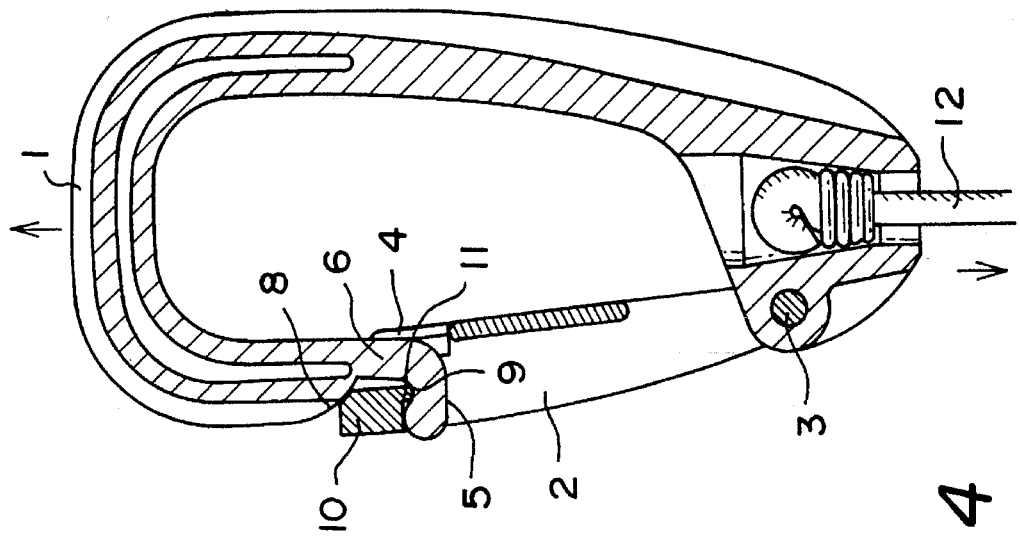
FIG. 3 is a longitudinal view in section of FIG. 1.
FIG. 4 is a cross section taken on part of FIG. 3, showing the raised portion of the notched coupling portion of the latch engaged with the rounded tip of the hooked end of the hook body.

Referring to FIGS. 1, 2, 3, and 4, a safety rope hook in accordance with the present invention is generally comprised of a hook body 1 and a latch 2 respectively molded from resilient plastic material. The hook body 1 defines an opening 13. The latch 2 has one end pivotably connected to the hook body 1 by a pivot 3 and an opposite end terminating in a notched coupling portion 4 engageable with the hooked end 6 of the hook body 1 to close the opening 13. The hooked end 6 of the hook body 1 terminates in a rounded tip section 7. The hooked end 6 of the hook body 1 further comprises an inward sloping guide surface 8 spaced above the rounded tip section 7, and a retaining groove 9 disposed between the inward sloping guide surface 8 and the rounded tip section 7. The notched coupling portion 4 of the latch 2 comprises a sloping guide surface 10 for corresponding engagement against the inward sloping guide surface 8 on the hooked end 6 of the hook body 1, an inside projection 11 for engagement with the retaining groove 9 on the hooked end 6 of the hook body 1, and a raised portion 5. When the notched coupling portion 4 is moved to the hooked end 6 of the hook body 1, the rounded tip section 7 will be forced over the raised portion 5 and become engaged therewith. When the rounded tip section 7 and the raised portion 5 are engaged, the inside projection 11 is simultaneously forced into the retaining groove 9, and therefore the notched coupling portion 4 is firmly retained to the hooked end 6 of the hook body 1 to close the opening 13.

Figure 5:
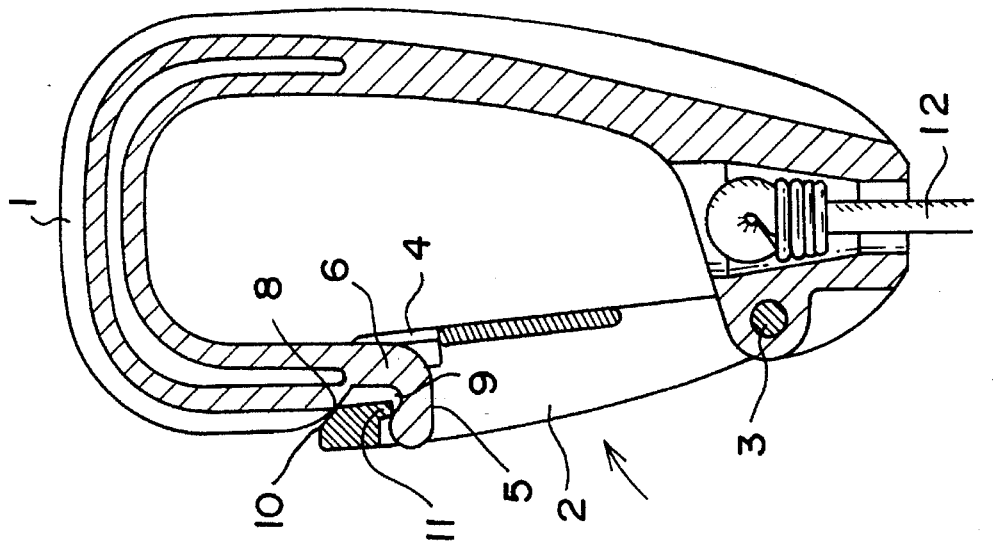
FIG. 5 is similar to FIG. 3 but showing the hook body stretched and the inside projection of the notched coupling portion of the latch inserted into the retaining groove on the hooked end of the hook body.
Figure 6:
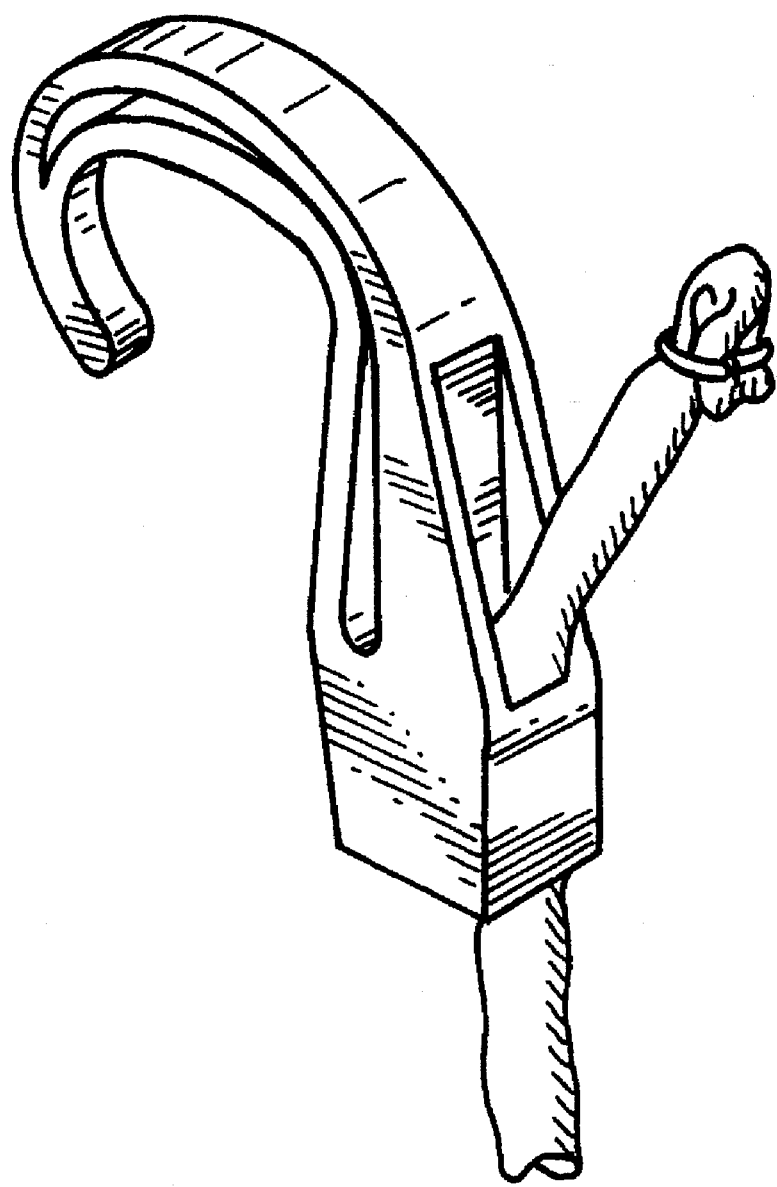
FIG. 6 shows a conventional rope hook.

The operation of the present invention is outlined hereinafter with reference to FIGS. 1 through 5. After the hook body 1 has been fixed to a rope 12, the notched coupling portion 4 of the latch 2 is moved outwards from the hooked end 6 of the hook body 1 to open the opening 13, and therefore the hook body 1 can be hooked on an object, such as a frame bar. After the hanging of the hook body 1 on the object, the notched coupling portion 4 of the latch 2 is forced to the hooked end 6 of the hook body 1, permitting the rounded tip section 7 of the hooked end 6 of the hook body 1 to pass over the raised portion 5 in a snap fit manner. As soon as the rounded tip section 7 is forced over the raised portion 5, the rounded tip section 7 and the raised portion 5 become engaged with each other. When the rope 12 is stretched after the hanging of the hook body 1 and the engagement of the rounded tip section 7 with the raised portion 5, the sloping guide surfaces 8 and 10 will be forced toward each other, causing the inside projection 11 to engage the retaining groove 9. Therefore, stretching the rope 12 will reinforce the engagement between the hooked end 6 of the hook body 1 and the notched coupling portion 4 of the latch 2. When the stretching force is released from the rope 12, the inward projection 11 will immediately detach from the retaining groove 9 by means of the resilient plastic material forming the safety rope hook itself, thus allowing the notched coupling portion 4 of the latch 2 to be opened by applying force to disengage rounded tip section 7 from raised portion 5.

While only one embodiment of the present invention has been shown and described, it will be understood that various modifications and changes could be made without departing from the spirit and scope of the invention. For example, the relative positions between the raised portion 5 and the rounded tip 7 as well as the relative positions between the inside projection 11 and the retaining groove 9 may be changed without affecting the operation of the present invention.

What is claimed is:

1. A safety rope hook of the type including a hook body having one end for connection to a rope and an opposite end terminating in a hooked end defining an opening, and a latch having one end pivotally connected to the hook body and an opposite end terminating in a coupling portion engageable with the hooked end of the hook body to close the opening, the improvement comprising the hooked end terminating in a rounded tip, the coupling portion of the latch including a raised portion detachably engageable by the rounded tip for connecting the coupling portion of the latch to the hooked end, the hooked end further including a retaining groove, the coupling portion further including an inside projection engageable within the retaining groove when the hook body is stretched longitudinally after the rounded tip is engaged with the raised portion.

2. The safety rope hook of claim 1 wherein the hooked end further includes an inward sloping guide surface spaced above the rounded tip and the retaining groove is positioned between the inward sloping guide surface and the rounded tip, and the coupling portion further includes a sloping guide surface on an inside portion thereof for corresponding engagement with the sloping guide surface of the hooked end when the hook body is stretched longitudinally after the rounded tip is engaged with the raised portion.

3. The safety rope hook of claim 1 wherein the latch closes the opening when the latch is pivoted inwardly toward the hooked end and opens the opening when the latch is pivoted outwardly from the hooked end.

4. The safety rope hook of claim 1 wherein the rope hook is formed of resilient plastic material.

* * * * *